United States Patent
Martin et al.

(10) Patent No.: US 6,954,785 B1
(45) Date of Patent: Oct. 11, 2005

(54) SYSTEM FOR IDENTIFYING SERVERS ON NETWORK BY DETERMINING DEVICES THAT HAVE THE HIGHEST TOTAL VOLUME DATA TRANSFER AND COMMUNICATION WITH AT LEAST A THRESHOLD NUMBER OF CLIENT DEVICES

(75) Inventors: Hamish D. S. Martin, Edinburgh (GB); Iain Hogg, Edinburgh (GB); Peter I Oliver, Falkirk (GB); Ronald Brown, Dunfermline (GB); Mark A. Pearce, Edinburgh (GB)

(73) Assignee: 3Com Corporation, Santa Clara, CA (US)

( * ) Notice: Subject to any disclaimer, the term of this patent is extended or adjusted under 35 U.S.C. 154(b) by 656 days.

(21) Appl. No.: 09/641,407

(22) Filed: Aug. 17, 2000

(51) Int. Cl.[7] .................................. G06F 15/173
(52) U.S. Cl. ............................. 709/223; 709/224
(58) Field of Search ........................... 709/224, 223

(56) References Cited

U.S. PATENT DOCUMENTS

| | | | | |
|---|---|---|---|---|
| 5,712,981 A | * | 1/1998 | McKee et al. | 709/241 |
| 5,886,643 A | * | 3/1999 | Diebboll et al. | 709/224 |
| 5,917,808 A | * | 6/1999 | Kosbab | 370/254 |
| 5,974,460 A | * | 10/1999 | Maddalozzo, Jr. et al. | 709/224 |

FOREIGN PATENT DOCUMENTS

EP      0 615 362      9/1994

* cited by examiner

Primary Examiner—Le Hien Luu
(74) Attorney, Agent, or Firm—Michaelson & Associates; Peter L. Michaelson; Alberta A. Vitale

(57) ABSTRACT

A method and apparatus for identifying a device acting as a server on a network is disclosed which uses network data representing communications on the network. The network data contains source device, destination device, data transfer protocol and data volume information for each communication represented therein and may be collected by network traffic monitors or packet capture devices such as RMON2 probes on the network. Data relating to relevant server protocols is identified within the network data, and using the identified data, a device is determined to be acting as a server if it has the highest data volume for communications in which it is the source or destination device and which communications involve at least a threshold number of other devices. The method may be conveniently implemented in a computer program and may be used in conjunction with a network management application.

7 Claims, 2 Drawing Sheets

SYSTEM FOR IDENTIFYING SERVERS ON NETWORK BY DETERMINING DEVICES THAT HAVE THE HIGHEST TOTAL VOLUME DATA TRANSFER AND COMMUNICATION WITH AT LEAST A THRESHOLD NUMBER OF CLIENT DEVICES

BACKGROUND OF THE INVENTION

1. Field of the Invention

The present invention relates to an apparatus and method for identifying devices acting as servers on a network. The present invention is particularly suitable for use in the management of a network, although other uses are contemplated.

2. Description of the Related Art

Data communications networks are becoming increasingly common in many technological fields. The following description is concerned with computer networks such as local area networks (LANs) and wide area network (WANs) comprising a plurality of network devices connected together by media links. It will be appreciated that the present invention may be useful in relation to other types of networks such as telecommunications networks, including wireless networks.

Computer networks typically comprise a plurality of computers, peripherals and other electronic devices capable of communicating with each other by sending and receiving data packets in accordance with predefined network protocols. Each computer or other device on a network is connected to the network media, which in the case of a LAN network may be coaxial cable, twisted pair cable or fibre optic cable. Data is communicated across the media between devices on the network by sending and receiving data packets (also known as frames) in accordance with one or more predefined protocols.

As is known in the art, data may be communicated using protocols at several different layers, which may fall broadly into the seven layers represented in the Open Systems Interconnection (OSI) model.

For example computer networks typically employ the TCP/IP group of protocols. In the TCP/IP protocols, at the bottom layers, called the Physical/Data Link layers, a LAN typically employs the CSMA/CD protocol as defined by the standard IEEE 802.2, commonly known as Ethernet. Each device on the LAN has hardware with an associated MAC or physical address. Data packets are sent and received in accordance with the CSMA/CD or MAC protocol, and such data packets identify the MAC addresses of the source and destination devices of the data packet in the header of the data packet.

To enable data, such as email messages and web pages, to be communicated over the Internet, higher layer protocols such as IP, TCP, FTP, SMTP, are employed. For this purpose, every computer is assigned an IP address, for sending and receiving communications using the higher layer standard TCP/IP protocols. An IP address is a unique, 4 byte number, assigned to a network device for the purpose of communication using the TCP/IP protocols, and the source and destination IP addresses are included in the data packet communications using higher level protocols, such as the IP protocol at the "network layer" in the OSI model. Thus, in a network connected to the Internet, each end-station or personal computer (PC) having Internet access can be identified by identifiers including a MAC address and an IP address. In addition to computers, other network devices such as those involved in network management communicate using TCP/IP protocols such as the Simple Network Management Protocol (SNMP) and also have an IP address. Thus an IP address is a convenient identifier of a physical network device involved in communications on a network.

Some network devices act as "servers". A server is simply a device that provides a particular application service to a number of other devices called "clients". For example, a "WEB server" (or HTTP server) is a device on a network that can provide HTML (web) pages to HTTP clients. There are a large number of application services that rely on the concept of a small number of server devices providing a service to a number of client devices. Moreover, a single device may be a server for many different applications, and a device that is a server for one application may be a client for another application.

For a particular network or group of networks, an individual is often appointed to perform network management duties. The appointed network manager, often called the "network administrator" utilises a network management station which includes network management hardware and software. In particular, the network management software application is able to access management data from managed network devices and monitors on the network using an appropriate management protocol (e.g. the SNMP protocol). The data can then be collated and displayed in selected forms, or used to generate reports etc, for use by the network administrator.

It is desirable for a network management software application to be able to automatically identify servers on a network for many purposes. For example, when displaying a list of devices or a map of devices on the managed network, it might be useful to display servers differently from clients, to enable easy identification of the servers, since servers are often more important to the network administrator. Another reason to identify servers might be so that automatic reports could be generated on the status of the servers.

In addition to the desirability to identify servers in the management of a network, the identification of servers may be useful in other contexts. For example, other types of software application may use the identification of servers to automatically perform certain tasks on the network.

For instance, an automated program running on a computer on the network may "prioritise" network traffic going to and from server devices. For example, a network switch/router may prioritise all traffic to and from a SAP server in order to ensure that SAP runs as efficiently as possible. In another example, a network switch/router may prioritise all traffic to and from an H323 server, since H323 is a protocol used for transmitting voice across a network. By prioritising traffic to and from H323 servers, all telephone conversations running across the network would be clear and not affected by delays or interruptions caused by other network traffic.

In another instance, a software application running on the network may employ different security measures for servers. For example, a firewall may prevent any user from outside the network from accessing any SAP server. The automatic identification of SAP servers is therefore desirable, as opposed to conventional manual identification.

In another example, a firewall/switch/router may record the IP address of every device which accesses an Oracle database server, in order to identify such activity. The automatic identification of Oracle database servers using the present invention thus enable the provision of an automatic security log of all activity which could later be viewed by the network administrator.

Some other uses of the present invention include the identification of the address of an SMTP server for the purpose of a device on the network sending an e-mail. In addition, in some network management applications, the user may be required to enter the address of a certain type of server. A default value may be provided, in accordance with the present invention, which the administrator can then override, if appropriate.

The skilled person will appreciate that the present invention may be used in contexts other than the examples described above.

There may be many ways to identify servers for a particular application. For example, for a particular application, the application protocol itself may include some way to discover the server for the application. However, identifying servers in this way requires specific knowledge of the application and may not be possible in many circumstances.

SUMMARY OF THE INVENTION

The present invention aims to provide an apparatus and method for identifying devices acting as servers without requiring detailed knowledge of how the or each server application works.

According to a first aspect, the present invention provides a method for identifying a device acting as a server on a network, the method comprising: receiving data relating to communications on the network, the data containing source device, destination device, data transfer protocol and data volume information for communications; identifying data relating to relevant server protocols, and using the identified data, determining as a server device, the device which has the highest data volume for communications in which it is the source or destination device and which communications involve at least a threshold number of other devices.

According to a second aspect, the present invention provides a computer readable medium carrying a computer program for implementing the method in accordance with the first aspect of the present invention.

According to a third aspect, the present invention provides an apparatus for identifying a device acting as a server on a network, the apparatus comprising: a network device for collecting data representing communications on the network, the data containing source device, destination device, data transfer protocol and data volume information for communications represented therein; and a processor for receiving the data and for identifying data relating to one or more relevant server protocols, said processor using the identified data to determine as a server device, the device which has the highest data volume for communications in which it is the source or destination device and which communications involve at least a threshold number of other devices.

BRIEF DESCRIPTION OF THE DRAWINGS

Embodiments of the present invention will now be described, by way of example, with reference to the accompanying drawings, in which.

DETAILED DESCRIPTION OF THE PREFERRED EMBODIMENTS

The present invention utilises network data, hereafter referred to as "management data" which is gathered, for example, by monitoring data packets on the network. The management data contains data traffic information, i.e. information about communications or "conversations" between devices on the particular network concerned (or a part thereof). Typically the management data is collected over a particular period of time by monitoring data packets for all conversations observed at one or more monitored locations on the network. Thus, the management data not only contains information about conversations of relevant application service types (as discussed below) between a server device and a client device, but also conversations involving other devices and protocols on the network.

The management data may be collected at a variety of different locations on the network, or at a single location. The present invention is effective as long as the majority of data sent between the servers and the clients on the network is present in the utilised network management data.

In a preferred embodiment, the network management data is collected from one or more monitors or "probes" strategically located on the network being managed.

Figure 1:
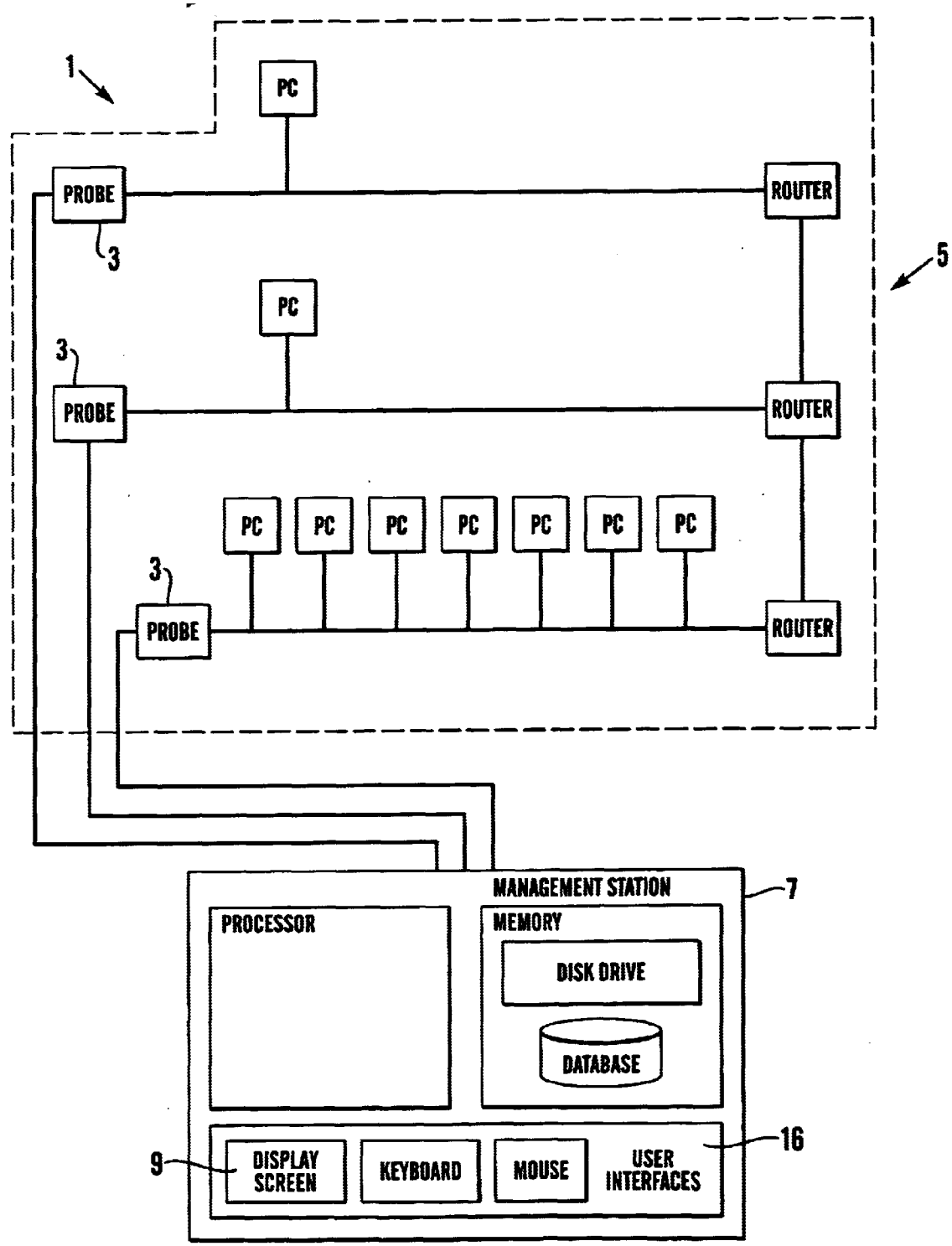
FIG. 1 is a block diagram of a typical managed network in accordance with a preferred embodiment of the present invention.

FIG. 1 shows a network including a network management system 1 in accordance with the preferred embodiment of the present invention. The network management system 1 comprises one or more network monitors or "probes" 3, which are strategically situated on a network 5 to monitor data traffic, and a network management station 7 comprising the necessary hardware (processor and memory) and network management software for retrieving, storing and processing data collected by the network probes 3. The management station 7 also includes interfaces for use by the network administrator including a keyboard, a mouse and a display screen 9, and a printer.

The network management software of the preferred embodiment of the present invention includes an application for managing data in a database or similar data storage. The database stores network traffic data, called "conversation data", for particular time periods, including a data table as described below. Conversation data, (i.e. data containing information about a "conversation" such as the number of data packets transferred between two devices during the conversation and the protocols used) is indexed by the identifiers (e.g. the IP addresses) of two devices, the source device and the destination device. In addition, the preferred data table described below is also indexed by protocol.

In the preferred embodiment, the probes 3 are RMON2 probes, which are well known in the art. RMON2 is defined in RFC 2021 "Remote Monitoring Management Information Base, Version 2" which is incorporated herein by reference. RMON2 defines various types of management data which are collected by RMON2 probes or RMON2 compliant managed network devices. The different types of data are collected and presented as conceptual tables of data. For the purpose of the preferred embodiment, data contained in the RMON2 "alMatx table" is utilised since this data has the preferred properties for server identification, i.e. the data is indexed by source device, destination device and protocol. It will be appreciated that other RMON data tables may be employed.

As the skilled person will appreciate, the present invention is not limited to use with RMON2 probes or managed devices. On the contrary, it would be possible to obtain the required management data from a variety of other sources.

Some sources of data might only include information about data sent in relation to certain application types or a single application. Such data might be collected by a "packet capture device", i.e. a device capable of capturing data packets from the network which match certain criteria, such as destination or protocol. For example, the data for use in the present invention could be collected using the "packet capture" facility of an RMON probe, specifying the capture of all data packets relating to one or more relevant server protocols. A data table may then be created in the form set out below.

In another alternative, a firewall may be configured to collect the relevant conversation data. The firewall may store data about every conversation passing through it and store the data therein or on a remote device. The data may then be represented in a data table as set out below.

In the following description of the preferred embodiment, it is assumed that RMON2 data is retrieved from the RMON2 probes, stored in the database and presented by the network management software application as a data table with the fields:

[source], [destination], [application], [volume].

Each row in the table represents the data sent from a source device to a destination device over the network. The data may relate to a plurality of monitored conversations involving the same source and destination devices. The meaning of the data fields is as follows:

The source field, [source], represents the device that sent the data, i.e. the source device. Any suitable form of identification of devices may be used. For example, the identifier of this field could take the form of an IP addresses or any other identifier serving to identify a device within the context of the application/protocol.

The destination field, [destination], represents the device to which data was sent. The form of identification of the destination device is similar to that of the source device.

The application field, [application], identifies the application service or protocol to which this row of data relates. For example, the field may have the value "HTTP" for a data row which represents the transfer of information sent by a WEB server to a WEB client using the application protocol HTTP. Other values for the application field include "FTP" for FTP communications between FTP servers and clients; "SMTP" for e-mail server and client applications, and "Notes" for Lotus Notes server and client applications. Other possible values are specified in the RMON2 RFC referenced above, including "DNS", "IPX"; "SAP"; "Oracle"; "SIP"; "HTTPS"; "NetBeui"; "NFS"; "NetBios"; "NCP"; "SMB" and "H323".

The volume field, [volume], is a numerical value which represents the volume of data sent from the source device to the destination device for the monitored conversation(s). A number of different measurements for volume are possible. For example, the value of the volume field may be the number of octets sent from the source device to the destination device. Alternatively the volume may be the number of data packets sent from source to destination. Alternatively, the volume may represent the number of network connections between the source device and the destination device, rather than containing a precise indication of the volume.

As the skilled person will appreciate, some techniques for collecting conversation data may analyse only a small proportion of the data packets carried on the network. For example, sapling may be employed whereby only one out of every 1000 network packets are analysed. Thus, the volume field may be purely representative of the volume.

The data contained in this data table is utilised as the "input management data" referred to below.

The apparatus and method of the present invention, described below, generates a list of one or more servers, i.e. devices that have been identified as servers, of a particular type. In order to discover many different types of server, the method can be applied repeatedly to the same input management data.

In addition to the input management data described above, the apparatus and method requires two additional input parameters, namely: a list of applications, "A", and a threshold value "T". The parameters "A" and "T" may be input manually by the user i.e. the network administrator, or default values may be employed.

In order to identify a list of servers of a particular type, "A" and "T" must be chosen as follows:

"A" identifies the list of applications served by the type of server to be identified. For example, to detect WEB servers, list "A" would specify the HTTP and FTP protocols. The entries in list "A" are chosen to correspond to values which may appear in the [application] field of the input data.

"T" is a threshold value. This would normally have the value 1. Only servers that have been serving more than T clients are detected. For certain applications, or with certain input data, it is possible that the method may produce incorrect results, in which case increasing the value of T can improve the accuracy of the results.

Figure 2:
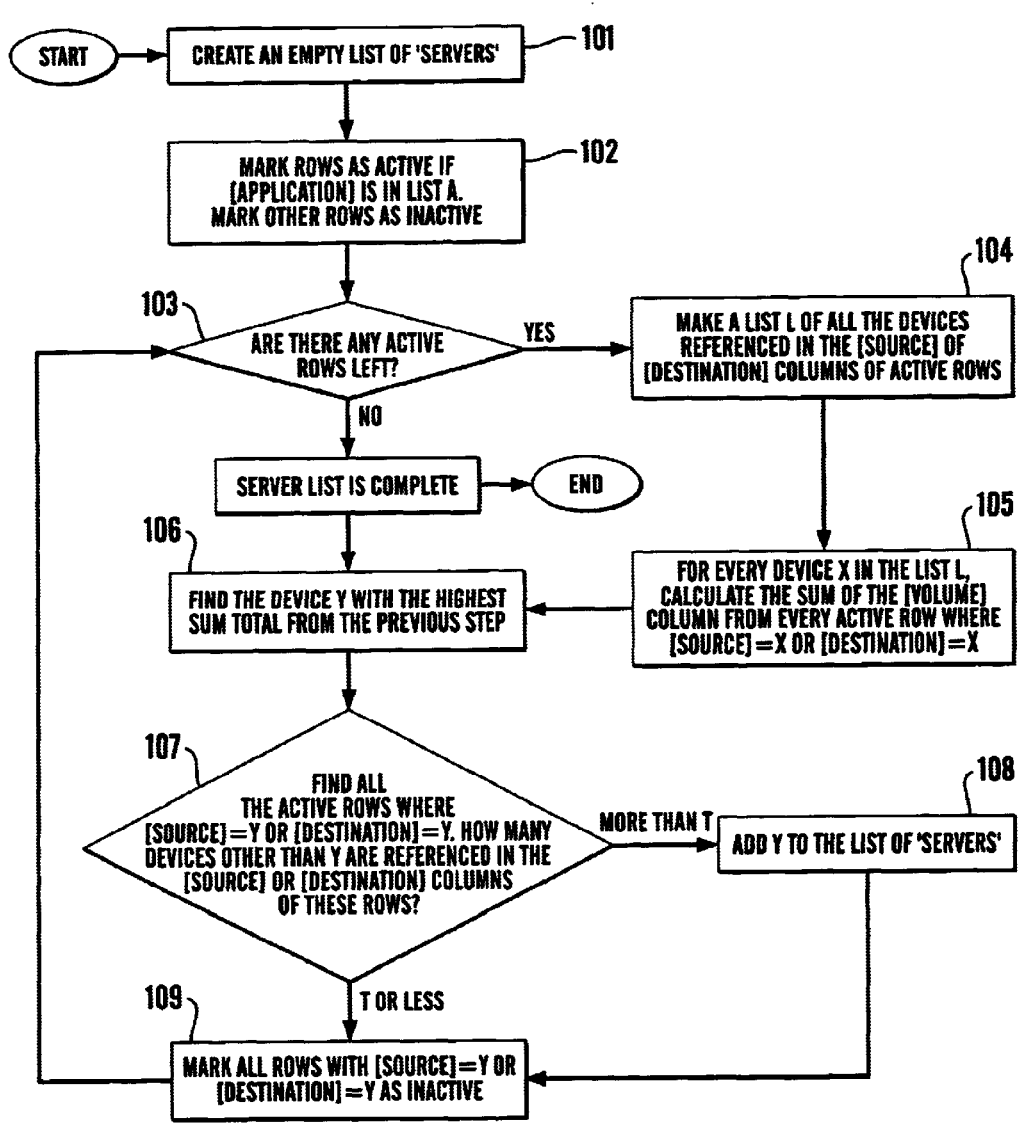
FIG. 2 is a flow diagram showing the steps performed by a program in accordance with a preferred embodiment of the present invention.

FIG. 2 shows a flow diagram of the method steps performed in accordance with a preferred embodiment of the present invention. In the preferred embodiment the method is implemented in the form of a computer program which may form part of, or be used in conjunction with, the network management software application running in the network management station 7 of FIG. 1. The computer program of the preferred embodiment may be provided on a computer readable medium such as a magnetic or optical disk which may be loaded into the disk drive of the management station 7 of FIG. 1. Alternatively, the computer program may be carried on a computer system carrying a website which permits downloading of the computer program over the Internet on a carrier wave to the management station 7. It will be appreciated that the method of the present invention may be implemented in forms other than a computer program, including hardware.

The program utilises the data table collected over a particular time period and, in the preferred embodiment, stored in the database as described above, as the input network management data and the input parameters for "A" and "T". In accordance with the preferred embodiment, rows in the input data can be marked as "active" or "inactive" by the program during processing.

One way to permit the marking of rows as active or inactive is to add another field to the input database table called "active". This field may have the value "true" or "false". Active rows may have the value true, whilst inactive rows may have the value false in this field.

As the skilled person will appreciate, other techniques for marking the rows as active are possible. In other embodiments, inactive rows of the input data may be removed so that marking is unnecessary.

At step 101 the program creates an empty list of servers (i.e. devices which are servicing clients).

At step 102 the program compares the [application] field in each row of the input data with the values for the parameter A, and where there is a match, the program marks the row as active. Thus, for example, if the user is interested in identifying WEB servers, and has specified HTTP and FTP protocols in list A, the program marks as active all rows of data in the input data table which have an [application] field of either HTTP or FTP.

At step 103, the program considers whether there are any active rows in the input data. If there are no rows marked as active, the server list is complete and the program ends. Alternatively, if step 103 finds that there are active rows, the program continues with step 104.

At step 104, the program lists all the [source] and [destination] device fields from the rows of data marked as active. Accordingly, in the example of identifying WEB servers, the list thus includes identifiers for some network devices involved in communications using the HTTP and FTP protocols, and should therefore include one or more WEB servers.

At step 105, for each device X, the program calculates the sum of the [volume] fields for all active rows where X=[source] or X=[destination].

At step 106, the program identifies the device Y with the highest sum total determined in step 105.

At step 107, the program finds all active rows involving the device Y determined in step 106, i.e. where [source]=Y or [destination]=Y and determines how many other devices are identified as [source] or [destination] in those active rows. The determined number of other devices is compared with the input value T, and if it is greater than T the program continues with step 108. Otherwise, that is, if the number of other devices is less than or equal to T, the program goes straight to step 109. At step 108 the device Y is added to the list of servers created at step 101, and the program continues with step 109.

At step 109 the active rows involving device Y as determined in step 107 are marked as inactive and the program continues with step 103.

As the skilled person will appreciate, the program steps illustrated in FIG. 2 are readily implemented using conventional database techniques. For example, conventional SQL database operations may be employed to manipulate the data table data as described in a standard SQL database.

In order to identify servers of different types, the program illustrated in FIG. 2 can be run using the same input data, but each time using different parameter values for "A" and "T" according to the type of server to be identified.

As the skilled person will appreciate, the method and apparatus for the automatic identification of server devices in accordance with the present invention may be used in conjunction with a variety of hardware and software applications. Such applications may not be network management applications. In addition, the data utilised by the present invention need not be stored in a database or other data storage but may be collected and utilised as and when it is needed by the relevant application.

The present invention is not limited to the described embodiments but rather includes all such variations, modifications and equivalents which fall within the spirit and scope of the invention as defined in the accompanying claims.

What is claimed is:

1. A method for identifying a device acting as a server on a network, the method comprising:

receiving data representing communications on the network, the data containing source device, destination device, data transfer protocol and data volume information for communications represented therein;

identifying, from the received data, data relating to one or more relevant server protocols;

using the identified data, determining as a server device, the device which has the highest data volume for communications in which it is the source or destination device and in which at least a threshold number of other devices are involved;

after the step of identifying data relating to relevant server protocols, identifying the devices involved in the communications represented in the identified data using the source device and destination device information, and for each identified device, determining the total volume of data transferred during communications represented in the identified data involving the device using the volume information;

after the step of determining the total volume of data transferred for each device, identifying the device with the highest total volume;

after the step of identifying the device with the highest total volume, determining the number of other devices involved in communications, represented in the identified data, with the identified device;

after the step of determining the number of other devices, comparing the determined number against a predetermined threshold number, and if the determined number exceeds the predetermined threshold number, determining that the identified device with the highest total volume is a server device.

2. A method as claimed in claim 1, wherein the step of identifying data relating to relevant server protocols comprises:

for each communication included in the received data, comparing the data transfer protocol with at least one predefined server protocol, and when the comparison results in a match, identifying the corresponding received data as relating to a relevant server protocol.

3. A method as claimed in claim 2, wherein the step of identifying further includes marking the identified data.

4. A method as claimed in claim 1, further comprising:

removing data representing communications involving the determined server device from the identified data.

5. A method as claimed in claim 4, wherein the step of removing comprises unmarking the data.

6. On a computer readable medium, a computer program comprising:

program means for receiving data representing communications on the network, the data containing source device, destination device, data transfer protocol and data volume information for communications represented therein;

program means for identifying, from the received data, data relating to one or more relevant server protocols, and program means for using the identified data, determining as a server device, the device which has the highest data volume for communications in which it is the source or destination device and in which at least a threshold number of other devices are involved;

wherein the program means for determining as a server device further comprises:

program means for identifying, after identifying data relating to relevant server protocols, the devices involved in the communications represented in the identified data using the source device and destination device information;

program means for determining, for each identified device, the total volume of data transferred during communications represented in the identified data involving the device using the volume information;

program means for identifying, after said determining, the total volume of data transferred for each device, the device with the highest total volume;

program means for identifying, after said determining, the total volume of data transferred for each device, the device with the highest total volume; and program means for determining, after said identifying, the device with the highest total volume the number of other devices involved in communications, represented in the identified data, with the identified device;

program means for comparing, after said determining the number of other devices, the determined number against a predetermined threshold number; and program means for determining, if the determined number exceeds the predetermined threshold number, that the identified device with the highest total volume is a server device.

7. A computer program as claimed in claim 6, further comprising:

providing means for removing data representing communications involving the determined server device from the identified data.

\* \* \* \* \*